(12) United States Patent
Forsberg

(10) Patent No.: US 7,519,738 B2
(45) Date of Patent: Apr. 14, 2009

(54) METHOD FOR MOVING OF FLOWS IN COMMUNICATION NETWORKS

(75) Inventor: Dan Forsberg, Espoo (FI)

(73) Assignee: Nokia Corporation, Espoo (FI)

( * ) Notice: Subject to any disclaimer, the term of this patent is extended or adjusted under 35 U.S.C. 154(b) by 1038 days.

(21) Appl. No.: 10/757,429

(22) Filed: Jan. 15, 2004

(65) Prior Publication Data

US 2005/0144321 A1 Jun. 30, 2005

(30) Foreign Application Priority Data

Dec. 15, 2003 (FI) ................................. 20031832

(51) Int. Cl.
*G06F 15/16* (2006.01)

(52) U.S. Cl. ....................... 709/245; 709/227; 709/231; 370/400

(58) Field of Classification Search ......... 709/245–246, 709/227–228, 231–232; 370/310, 331, 389, 370/400–401
See application file for complete search history.

(56) References Cited

U.S. PATENT DOCUMENTS

| 6,501,741 | B1 * | 12/2002 | Mikkonen et al. | 370/310 |
| 6,947,398 | B1 * | 9/2005 | Ahmed et al. | 370/400 |
| 7,042,879 | B2 * | 5/2006 | Eschbach et al. | 709/227 |
| 7,076,552 | B2 * | 7/2006 | Mandato | 709/231 |
| 7,272,651 | B1 * | 9/2007 | Bolding et al. | 709/227 |
| 7,308,506 | B1 * | 12/2007 | Evans | 709/245 |
| 2003/0055974 | A1 | 3/2003 | Brophy et al. | |
| 2005/0058068 | A1 * | 3/2005 | Ben Ali et al. | 370/401 |

FOREIGN PATENT DOCUMENTS

WO   WO 02/19660 A1   3/2002

* cited by examiner

*Primary Examiner*—Bharat N Barot
(74) *Attorney, Agent, or Firm*—Squire, Sanders & Dempsey L.L.P.

(57) ABSTRACT

The invention relates to a method, system, electronic device, network node and computer program for moving flows in a communication network, which comprises at least a first node, a second node, a third node and a content source node. The address of the first node is informed to the third node. At least one home address is obtained for the first node. Thereupon, at least a first flow carrying a media stream is provided from the content source node to the first node. A need is detected to move at least the first flow, and the media stream carried in it, from the first node to the second node. The need may be detected due to a user action or proximity of the first and second nodes. The address of the second node and the at least one home address is informed to the third node and at least the first flow is transmitted to the second node by the third node.

49 Claims, 10 Drawing Sheets

METHOD FOR MOVING OF FLOWS IN COMMUNICATION NETWORKS

BACKGROUND OF THE INVENTION

1. Field of the Invention

The invention relates to moving of flows in communication networks. Particularly, the invention relates to the swapping of packet flows between nodes or node interfaces in Internet Protocol (IP) based networks.

2. Description of the Related Art

Until recently still picture and hypertext based World Wide Web (WWW) browsing has been the predominant application in IP networks. WWW-page retrievals have constituted the largest stake of all Internet traffic. WWW-pages have mostly been browsed using fixed terminals. Through the use of Wireless Application Protocol (WAP) technologies or specific browsers that perform content adaptation, a portion of the content in WWW has recently been made available for mobile terminals.

However, recently multimedia streaming has gained importance as an IP network application. In multimedia streaming real-time video and audio presentations can be viewed over IP networks. A media stream represents, for instance, the video or the audio component in a multimedia session. The media stream comprises a continuous stream of packets that carry the encoded content between a content source and a client. Before the client is able to receive the media stream, it must have established a session with the content source. During the course of session establishment the client and the content source agree on media stream parameters such as content formats, bitrates, IP-addresses and port number for the stream. A multimedia session can be established, for instance, using the Internet Engineering Task Force (IETF) Session Initiation Protocol (SIP) specified in Request For Comments (RFC) document 3261 or the IETF Real-time Streaming Protocol (RTSP) specified in RFC 2326. The parameters associated with multimedia streams are described, for example, using the IETF Session Description Protocol (SDP) notation specified in RFC 2327, which is carried in session initiation signaling. In the media stream the encoded content is usually encapsulated in the IETF Real-Time Protocol (RTP) packets. The RTP is specified in RFC 1889. The purpose of the RTP is, for example, to carry timing information for the media streams, that is, media components.

The new Internet Protocol version IPv6 provides enhanced support for media streams via the concept of flows. In an IPv6 packet header there is a field called "Flow Label", which enables multiple individual media streams i.e. flows associated with same destination IP addresses to be identified and separated. The concept of flow has several applications. Different flows can be treated differently in terms of Quality of Service (QoS). A router participating to the routing of packets between a source and a destination may inspect the flow identification in the packets and treat the packets differently. It is also possible that some intervening routers use the flow label instead of destination address in packet routing. The flow label specifies a predefined path via a number of routers. This kind of a solution, which is used, for example, in Multiprotocol Label Switching (MPLS), makes packet switching faster in intervening routers. The flows can also be utilized in a receiving system to identify individual media streams already at the IP layer. For example, it is possible to reroute packets from a given flow to another IP address.

With the introduction of the Mobile IP, which is specified in the IETF RFC 2002, it is possible to move nodes from one network interface to another and maintain a permanent or semi-permanent IP address, called a home address. In other words, the Mobile IP enables network layer mobility for nodes i.e. computer equipment connected to the Internet. The nodes may continue receiving packets wherever they happen to be attached to the Internet. The nodes may be attached either using fixed or wireless link layer connections. In the Mobile IP a node that has a home address and that may change its point of attachment is called a Mobile Node (MN). Packets destined to the MN home address are first sent to a Home Agent (HA). The HA is a router or computer node typically located in the mobile nodes home network. In IPv4 there is a Foreign Agent (FA), which is a router on a mobile node's visited network. The mobile nodes have link layer connection to the FA. The FA provides a pool of addresses for visiting mobile nodes in its care.

As the MN is attached to a new network interface, the MN must provide routing information for the HA so that it is able to route packets destined to the MN. In the case of the IPv4 the MN informs an address reserved from the FA to the HA. In the case of the IPv6 the MN informs the current network interface IP address to the HA. This address informing procedure is referred to as Binding Update (BU). The current network interface IP address or an address reserved from the FA is referred to as a Care-of-Address (CoA). When a packet destined to the MN home address is received by the HA, it maps the home address in the packet to the current care-of-address. In the case of the IPv4 the packet is tunneled to the FA and from there forwarded to the MN. In the case of the IPv6 the packet is sent by the HA directly to the MN. Namely, the IPv6 supports inherently the Mobile IP functionalities required to forward packets directly such as the re-mapping of the destination address to the home address.

In cases where text, still picture and application downloading based WWW- or WAP-browsing is used there is usually no need to transfer or swap browsing session related information between two terminals electronically, as a need arises to continue the browsing on another terminal. It might be useful to obtain browser cookies and bookmark information to another terminal, but this is not completely vital. The browsing session can be terminated at any moment in time on a first terminal and then later on continued on a second terminal even without transmitting information about a current page from the first terminal to the second terminal. Usually a user can without effort navigate back to the WWW-page last browsed. For convenience the WWW-address, in other words, the Uniform Resource Locator (URL) may have to be written down or sent to the second terminal using E-mail. In terms of the technical implementation the browsing session in the second terminal can be resumed from scratch by fetching WWW-page last browsed using a URL provided to the browser. Naturally, there are special cases where the site that has been browsed requires a login procedure, which must then be repeated in the second terminal.

The situation is much more difficult in the case of IP multimedia streaming sessions, if a given multimedia stream must be swapped on the fly to a second terminal. The user must resume manually the video or audio streaming at the point where it was interrupted at the first terminal. There may be additional complications such as the fact that the multimedia viewer software may have different settings and information concerning the quality of service and presentational characteristics of different types of multimedia streams. The presentational characteristics include such settings as window size for video, audio volume and bass boosting.

From the viewpoint of technical implementation the moving of a multimedia stream, in other words a flow, means that the first terminal must interrupt the flow at the flow source node. Thereupon, the second terminal must restart the flow at the second terminal.

Reference is now made to FIG. 1, which illustrates the aforementioned process for moving a flow between two nodes, in other words, terminals. In FIG. 1 there is a node 130 and a node 140. In this case node 130 and node 140 are mobile nodes with wireless link layer connections to the Internet. It should be noted that hereinafter in this disclosure, Internet refers to any IP network such as a corporate Intranet or any closed private IP network. Similarly, the nodes could as well be fixed network nodes connected, for example, to an Ethernet. In FIG. 1 there are two base stations, a base station 120 and a base station 122. There are two routers, a router 110 and a router 112. Base stations 120 and 122 are connected to routers 110 and 112 using connections 150 and 156, respectively. There is a media source 100, which is an arbitrary computer equipment capable of providing at least one media stream to node 130 or node 140. The media source may be, for example, providing a video stream. Media source 100 is connected to routers 110 and 112 using connections 152 and 154. The connections 150-156 are in this case IP network connections.

In FIG. 1, media source 100 provides a media stream, that is, a flow first to node 130 via router 110. Arrows 160 and 161 represent a given packet associated with the flow on its way towards node 130. When a user decides to move the flow to node 140, node 130 gives a request to media source 100 to stop transmitting packets associated with the flow. This is represented using arrows 162 and 163. The request may be, for example, an RTSP teardown message. When a user initiates the re-establishment of the flow at node 140, it requests media source 100 to start sending the media stream, that is, the flow to it. The request represented by arrows 164 and 165 specifies the multimedia content associated with the flow and the state of content consumption. The state of content consumption usually boils down to the time offset from the start of the content, which represents the video or audio content still remaining for the user. It should be noted that the re-establishment of a media stream, that is, a flow may take several requests and responses between node 140 and media source 100, but they have been omitted for simplicity. Arrows 166 and 167 represent the conveying of flow packets from media source 100 to node 140, as the flow has been re-established.

Without network layer mobility solutions, including, for example, the Mobile IP RFC 2002 and the IPv6, it would not be possible for the terminal to change network interfaces and thus temporary care-of-addresses at all. Always when the terminal moves between network interfaces, the flow would have to be interrupted at a first network interface and resumed later on at a second network interface. The Mobile IP alleviates this problem by enabling the terminal, that is, the mobile node to maintain a single home address. Flow packets can be streamed to the mobile node by a media source without it being necessary for the media source to be aware of the fact that the terminal changes network interface during the course of providing the flow.

Reference is now made to FIG. 2, which illustrates network layer mobility in providing a flow from a media source. In FIG. 2 there is a node 140, which is a mobile node. There are two base stations, base station 120, which is connected to router 110, and base station 122, which is connected to router 112. There is a media source 100, which provides a flow to node 140 continually without being aware of changes in the care-of-address of node 140. At first, base station 120 serves node 140. While being served by base station 120 node 140 has a first care-of-address. This care-of-address has earlier been registered by node 140 to a home agent 114, which has created a mapping between care-of-address and the home address of node 140. Media source 100 provides a flow of packets to node 140, which is represented by arrows 200, 201 and 202. The flow goes via HA 114, router 110 and base station 120. Gradually node 140 moves to the area of base station 122, where it will have a second care-of-address. When link layer establishment with base station 122 and care-of-address acquisition has been performed by node 140, it performs a binding update with HA 114. This involves the sending of binding update request, which is represented by arrows 203 and 204. Essentially, the binding update carries the current IP care-of-address. The binding update request carries as well data origin authentication information. The binding update is acknowledged by HA 114, which is represented by arrows 205 and 206. In practice, the registration procedures with base station 122 and binding update with HA 114 must be authenticated using public key signature technologies. This may involve the generation of nonce values by the base station or HA, which must then be included in the messages generated, signed and sent by node 140. When the binding update has been processed and approved by HA 114, it changes the home address of node 140 to point to the second care-of-address. This causes that the packet flow gets forwarded via router 112, base station 122 to node 140. The new route for flow packets is represented by arrows 207, 208 and 209.

A remaining disadvantage of a solution such as the one shown in FIG. 2 is that a flow cannot be transferred between two genuine nodes or two network interfaces connected to a single node that appear to the Internet as two individual nodes. One solution would be to make a binding update from the second node to a home agent, but this would exclude the possibility of continuing to receive part of traffic destined to the home address still to the first node. One solution to this problem has been introduced with multihoming protocols such as IETF Stream Control Transmission Protocol (SCTP), specified in RFC 2960 and in ITU-T signaling system no. 7 (SS7) Message Transfer Part (MTP). In multihoming protocols it is possible to have several simultaneous connections open from one sender to a number of receivers. The receivers may be genuinely separate hosts, that is, nodes or they may be alternative interfaces associated with a single node. All the alternative connections are continually kept alive between the sender and the receivers. If one of the connections fails, one of the remaining alternatives can be immediately used to reroute packets to the destination. This type of a solution is used in high-reliability environments such as voice over IP networks for signaling transfer.

Reference is now made to FIG. 3, which illustrates the principle of multihoming protocols. In FIG. 3 there is a media source 100, which has parallel connections 310-314 with hosts 300-304, respectively. The connections are over Internet 320, which can be, of course, any other IP network. In case there is a need for media source 100 to start forwarding flow packets via one of the alternative connections this can be done without further connection establishment since the required connections are already there.

The immediate disadvantage of a solution such as illustrated in FIG. 3 is that media source 100 must be aware of the alternative connection and support a multihoming protocol such as the SCTP. The use of this kind of protocols is uncommon in Internet and severely limits the availability of content services. Besides, it is not meaningful to implement flow mobility to all source nodes. This would require significant implementation and installation efforts. The flow mobility must be at least hidden from the content source application so that flow mobility must not be taken care at the application layer.

SUMMARY OF THE INVENTION

The invention relates to a method of moving flows in a communication network, comprising at least a first node, a second node, a third node and a content source node. In the method at least one home address is obtained for the first node; the address of the first node is informed to at least one of the third node and the content source node; at least a first flow is provided from the content source node to the first node; a need to move at least the first flow from the first node to the second node is detected; the address of the second node and the at least one home address is informed to the at least one of the third node and the content source node; and at least the first flow is transmitted to the second node by the at least one of the third node and the content source node.

The invention relates also to a system comprising at least a first node, a second node, a third node and a content source node. The system further comprises: address management means in the first node for obtaining at least one home address and informing the network address of the first node to the at least one of the third node and the content source node; detecting means in the first node or in the second node for detecting a need to move at least one flow from the first node to the second node; address management means in the first node or in the second node for informing the network address of the second node and the at least one home address to the at least one of the third node and the content source node; routing means in the at least one of the third node and the content source node for routing the at least one flow based on home address to network address mapping information; and mapping management means in the at least one of the third node and the content source node for updating associations between the home addresses and network addresses.

The invention relates also to an electronic device comprising: address management means for obtaining at least one home address and informing the network address of the electronic device and the at least one home address to a network node; streaming means for receiving at least one flow each of which carries a media stream; and detecting means for detecting a need to move at least one flow between the electronic device and a second electronic device.

The invention relates also to a network node comprising: home address reservation means for providing a home address for at least one flow associated with an electronic device; address management means for registering a mapping from the home address and optionally a flow label to a current address of the electronic device; and routing means for routing at least one flow to the electronic device based on the registered association.

The invention relates also to a computer program comprising code adapted to perform the following steps when executed on a data-processing system: obtaining at least one home address for a first node from a third node; informing the address of the first node to at least one of the third node and a content source node; receiving at least a first flow from a content source node to the first node; detecting a need to move at least the first flow from the first node to a second node; informing the address of the second node and the at least one home address to the at least one of the third node and the content source node; and receiving at least the first flow in the second node from the at least one of the third node and the content source node.

In one embodiment of the invention the first and the second node are interface units associated with a single physical electronic device. The interface units are, for example, network interface cards that are connected to the single physical electronic device. To the first and second nodes are also counted the software executing in the single physical electronic device that participates in the management and control of the first and second nodes. The first node may be served by a first access network and the second node may be served by a second access network. In another embodiment of the invention the first and the second node are separate electronic devices.

In one embodiment of the invention the obtaining of the home address occurs as a response to informing the address of the first node to at least one of the third node.

In one embodiment of the invention the address of the second node and the home address is informed to the content source node, if the address of the first node and the home address have been informed to the content source node after the at least a first flow has been received from the content source node to the first node.

In one embodiment of the invention the providing of at least a first flow from the content source node to the first node is started at the request of the first node, which is sent via the third node to the content source node.

In one embodiment of the invention the third node and the content source node are same physical nodes.

In one embodiment of the invention the second node informs the address of the second node and the at least one home address to the content source node. The informing of the addresses to the content source node may be performed after the third node has been informed of the addresses.

In one embodiment of the invention a context associated with at least the first flow is transferred from the first node to the second node. The transferring of context may be performed using a point-to-point radio link or using a multi-node network, for example, a cellular radio system or a wireless local area network connected to at least one IP network. The multi-node network may also be an IP network comprising several networks, for example, several access networks and core networks. In other words, the multi-node network may be the Internet. The first node may be connected to a first access network and the second node may be connected to a second access network, which may be different access networks.

In one embodiment of the invention of packets received to the at least one home address are filtered in the at least one of the third node and the content source node based on flow labels indicated in packets that are received by the third node from the media source node.

In one embodiment of the invention the at least one of the third node and the content source node continues transmitting at least the first flow to the first node while already transmitting at least the first flow to the second node. The at least one of the third node and the content source node may continue transmitting to both nodes for the duration of the remaining flow and likewise for the duration of the entire session. The at least one of the third node and the content source node may continue transmitting to the first node only during a transition period, which lasts only a predefined time, for example, a few seconds. It should be noted that in this embodiment of the invention the moving of flows does not actually occur in a strict exclusive sense of the word move. In other words, the stream is forked to the first and the second nodes. The routing means in the third node must therefore be able to forward one incoming packet addressed to the at least one home address to both the current address of the first node and the current address of the second node. Similarly, routing means in the content source node must therefore be able to transmit one outgoing packet addressed to the at least one home address to both the current address of the first node and the current address of the second node.

In one embodiment of the invention the need to move at least the first flow is detected by the first node. In another embodiment of the invention the need to move at least the first flow is detected by the second node. The detection may be based on a user request that is given through the user interface of the detecting node.

In one embodiment of the invention said first node asks permission from said second node to move at least said first flow to said second node. In another embodiment of the invention said second node asks permission from said first node to get at least said first flow from said first node. The request for permission may be presented to the user of the node that receives the request. It is then up to the user to accept or reject the request.

In one embodiment of the invention said informing of the address of said second node and said at least one home address to said third node is performed by said first node. In another embodiment of the invention said informing of the address of said second node and said at least one home address to said third node is performed by the second node.

In one embodiment of the invention the need to move at least the first flow will be detected by either of the nodes based on the proximity of the first node and the second node. The proximity of the first and the second node may be detected using a point-to-point radio link such as a BLUETOOTH radio link. When the first and second nodes attain sufficient mutual radio coverage, it is detected that the nodes are in proximity. The proximity of the first and the second node may also be determined using GPS positioning or using a positioning service provided by a cellular system such as UMTS Location Services (LCS).

In one embodiment of the invention the need to move at least the first flow is detected due to a user action, for example, a request specified by the user with user interface actions.

In one embodiment of the invention a second key from a first key shared by the first node and the third node is derived in the respective nodes. Thereupon, the informing of addresses from the second node to the third node may be performed in the third node using the second key.

In one embodiment of the invention the communication network is an IP network. The binding updates may be implemented using mobility features supported by the IPv6 or the Mobile IP.

In one embodiment of the invention the first node and/or the second node may be a node connected to an IP network using a fixed connection such as, for example, an Ethernet connection, an ADSL line or optical fiber. In one embodiment of the invention an address of the first and/or the second node that is informed to the third node may be a permanent address configured to the node. In one embodiment of the invention an address of the first and/or the second node that is informed to the third node may be an address obtained from an address server node, for example, a Dynamic Host Configuration Protocol (DHCP) server node.

In one embodiment of the invention the first and the second node comprise authorization means for authorizing the moving of at least one flow between the nodes. In one embodiment of the invention, the authorization means comprise a user interface for asking permission from a user.

In one embodiment of the invention, the computer program is stored on a computer readable medium. The computer readable medium may be a removable memory card, read-only memory circuit, magnetic disk, optical disk or magnetic tape.

In one embodiment of the invention, the electronic device is a mobile device, for example, a laptop computer, a palmtop computer, a mobile terminal or a personal digital assistant (PDA). The mobile device may be, for example, a GPRS terminal, a UMTS terminal and a WLAN terminal. The electronic device may also be a fixed Internet node.

The benefits of the invention are related to the improved user friendliness and improved content providing for end-users. The invention allows moving of flows between network nodes. A user may prefer to receive a media stream using an alternative device or network interface, which provides better media quality, for example, larger and sharper video picture. With the invention it is now possible for the end user to start receiving a media stream from a different device without laborious end-user device manipulation. The process of stream swapping can be made automatic and it can be based on the proximity of devices. There is no need to separately interrupt the media stream associated the flow from a content source. Furthermore, the moving of the flow from a first node to a second node may be hidden from the content source node.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
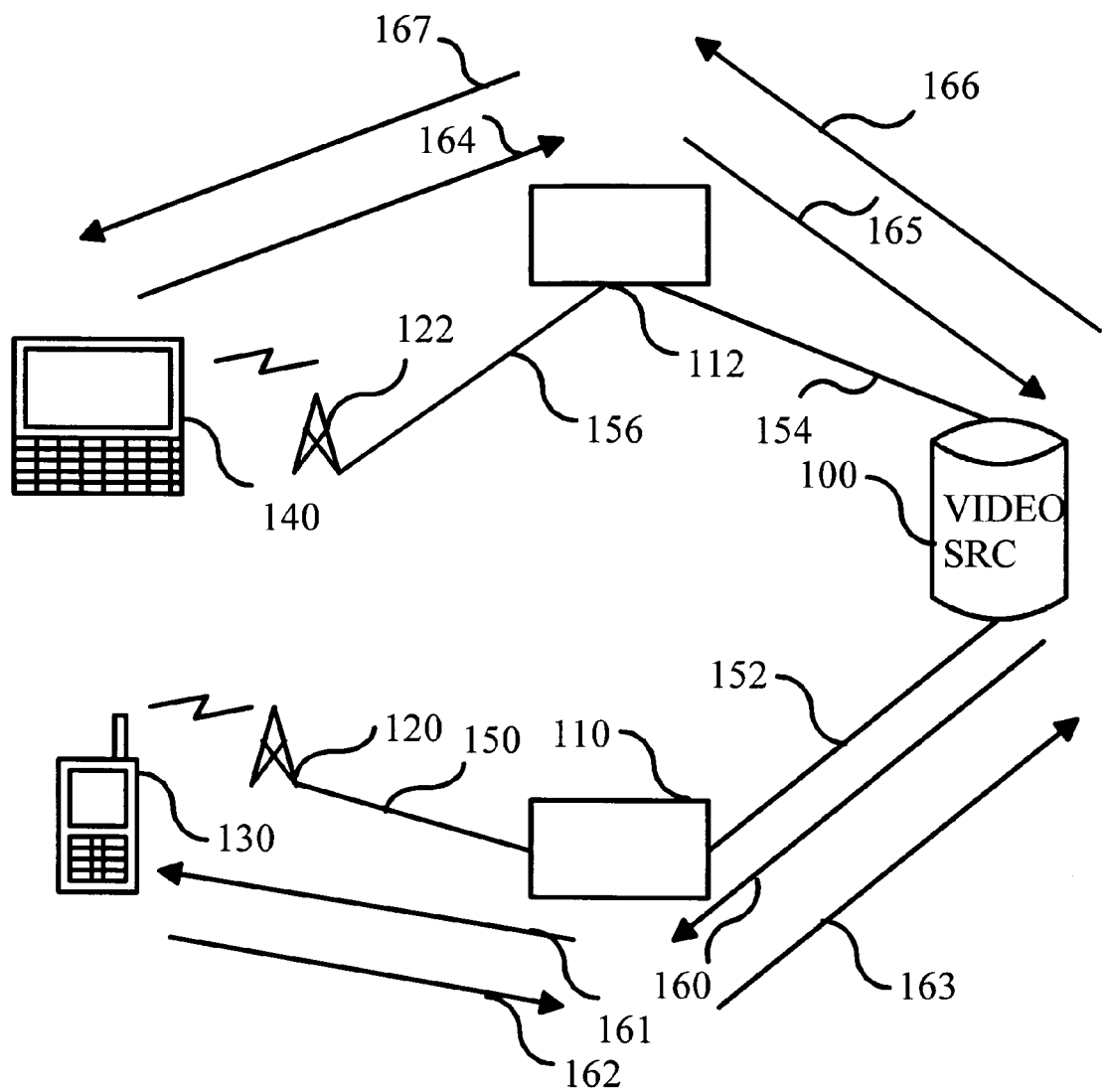
FIG. 1 (PRIOR ART) is a block diagram illustrating a prior art process for moving a flow between two nodes.
Figure 2:
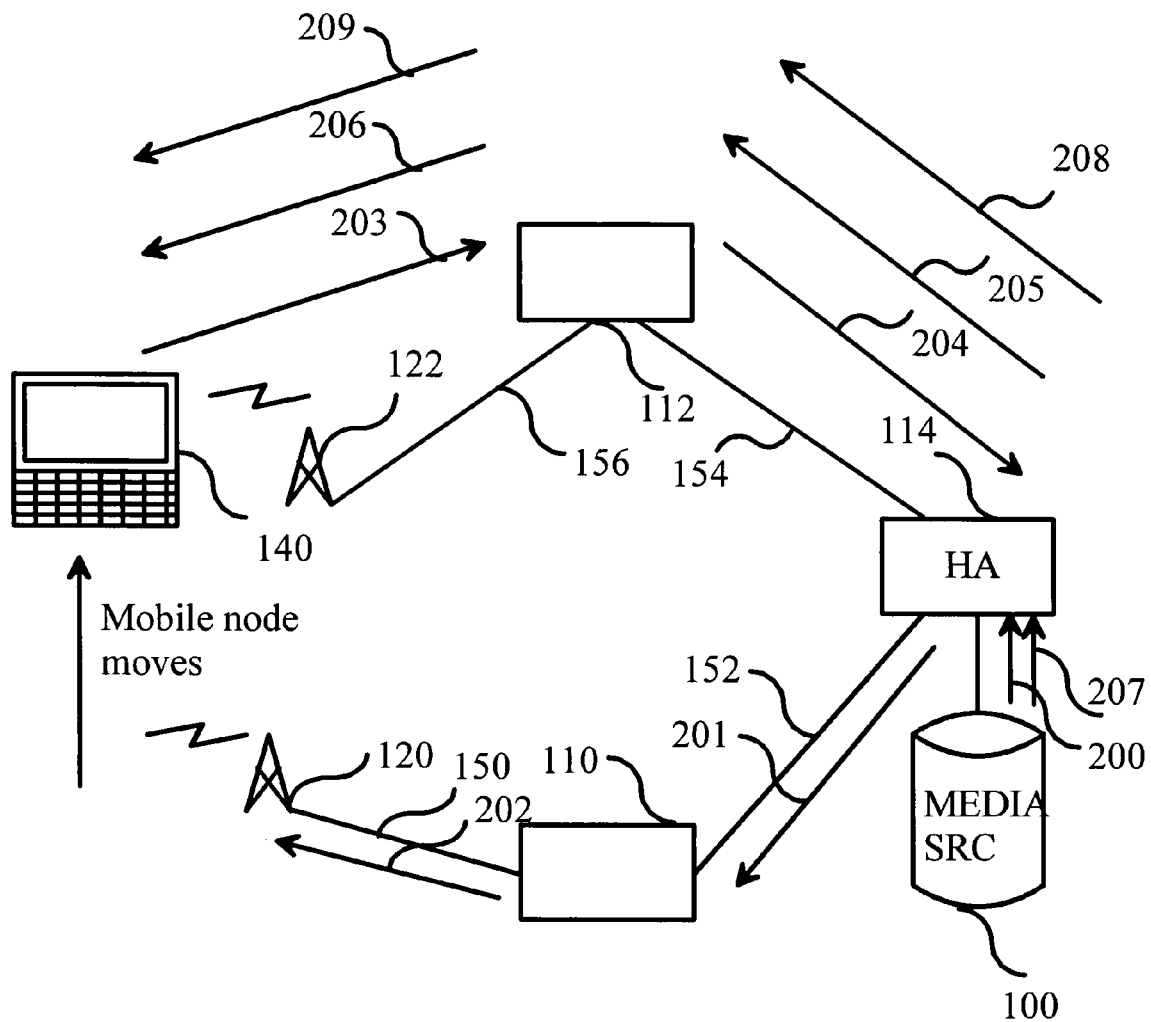
FIG. 2 (PRIOR ART) is a block diagram illustrating a prior art binding update procedure in Mobile IP.
Figure 3:
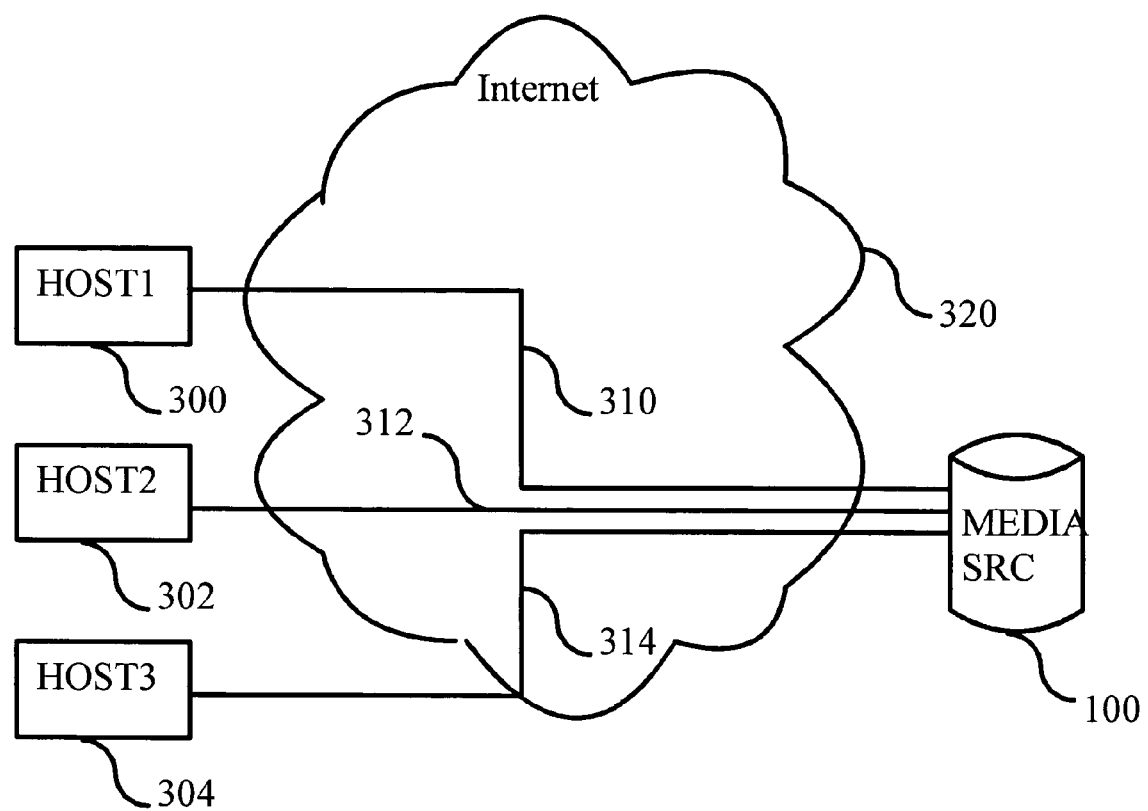
FIG. 3 (PRIOR ART) is a block diagram depicting a prior art arrangement supporting a multihoming protocol.
Figure 4:
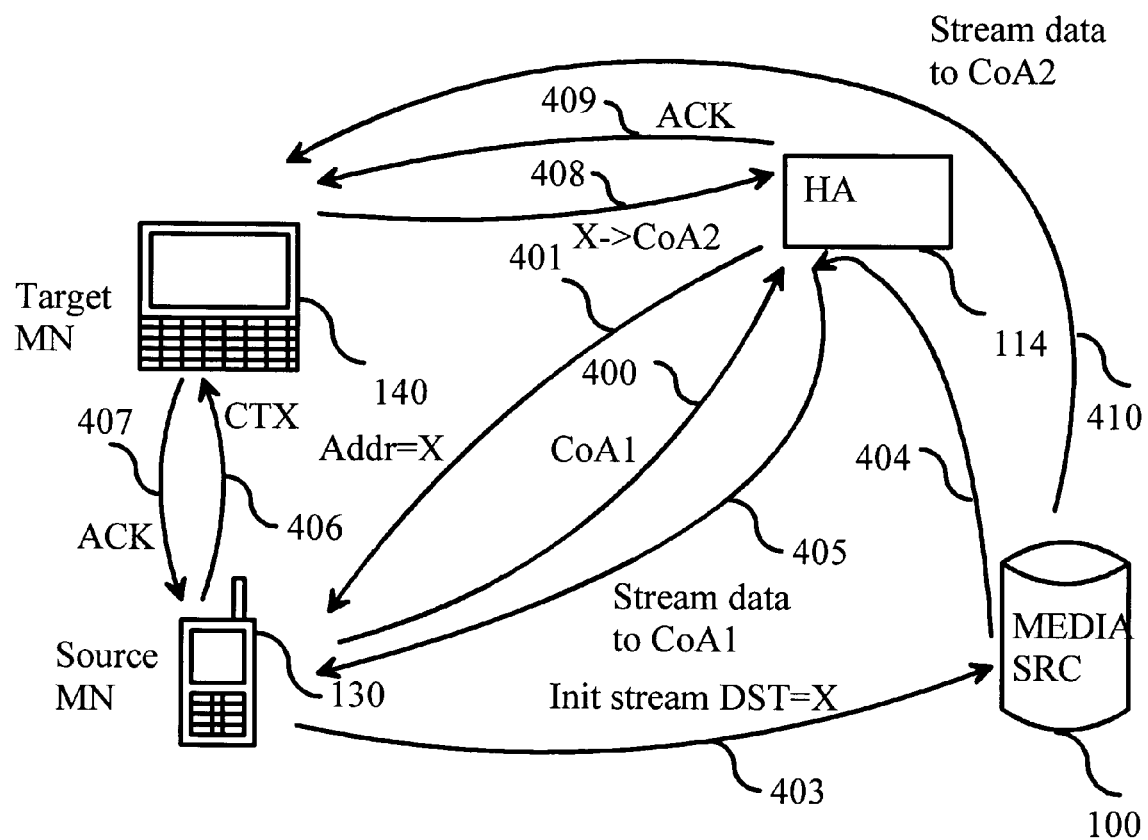
FIG. 4 is a block diagram illustrating a signaling procedure for swapping a flow between two nodes in a communication system, in accordance with the invention.
Figure 5:
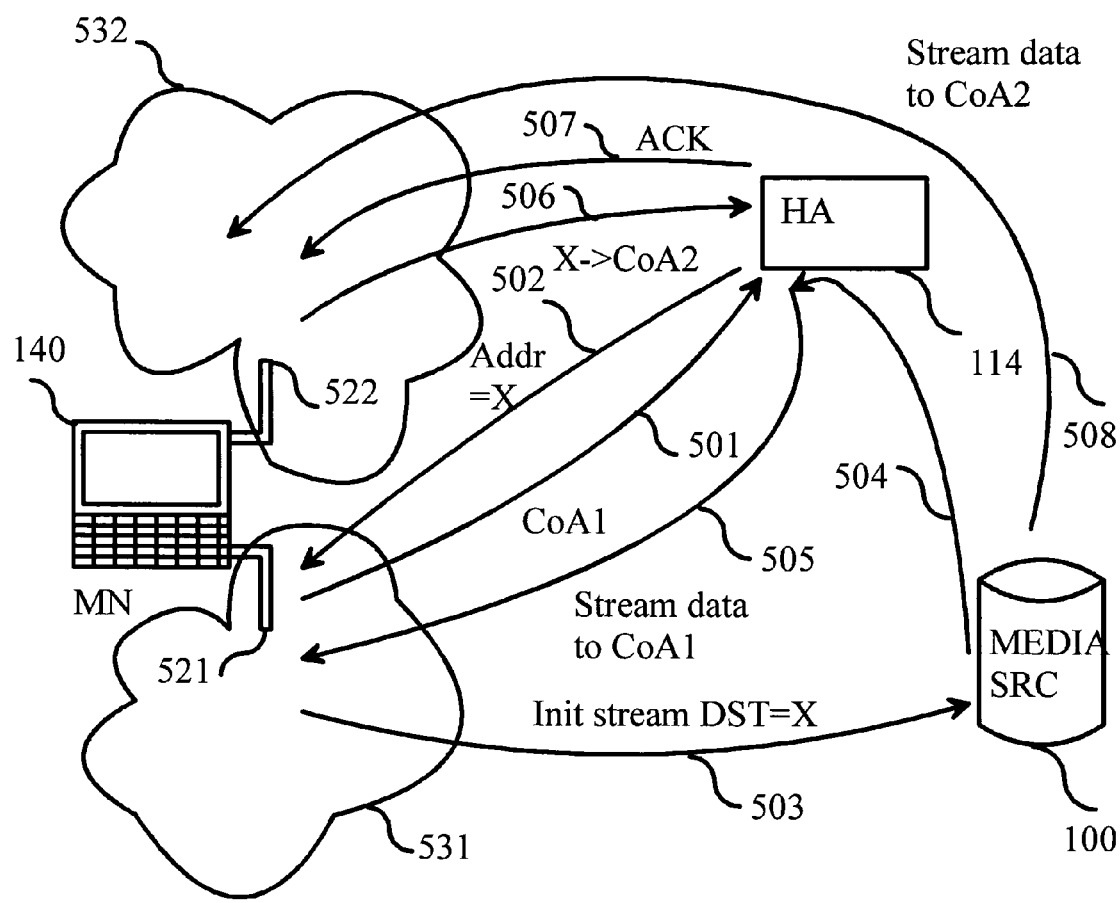
FIG. 5 is a block diagram illustrating a signaling procedure for swapping a flow between two network nodes associated with a single physical node in a communication system, in accordance with the invention.
Figure 6:
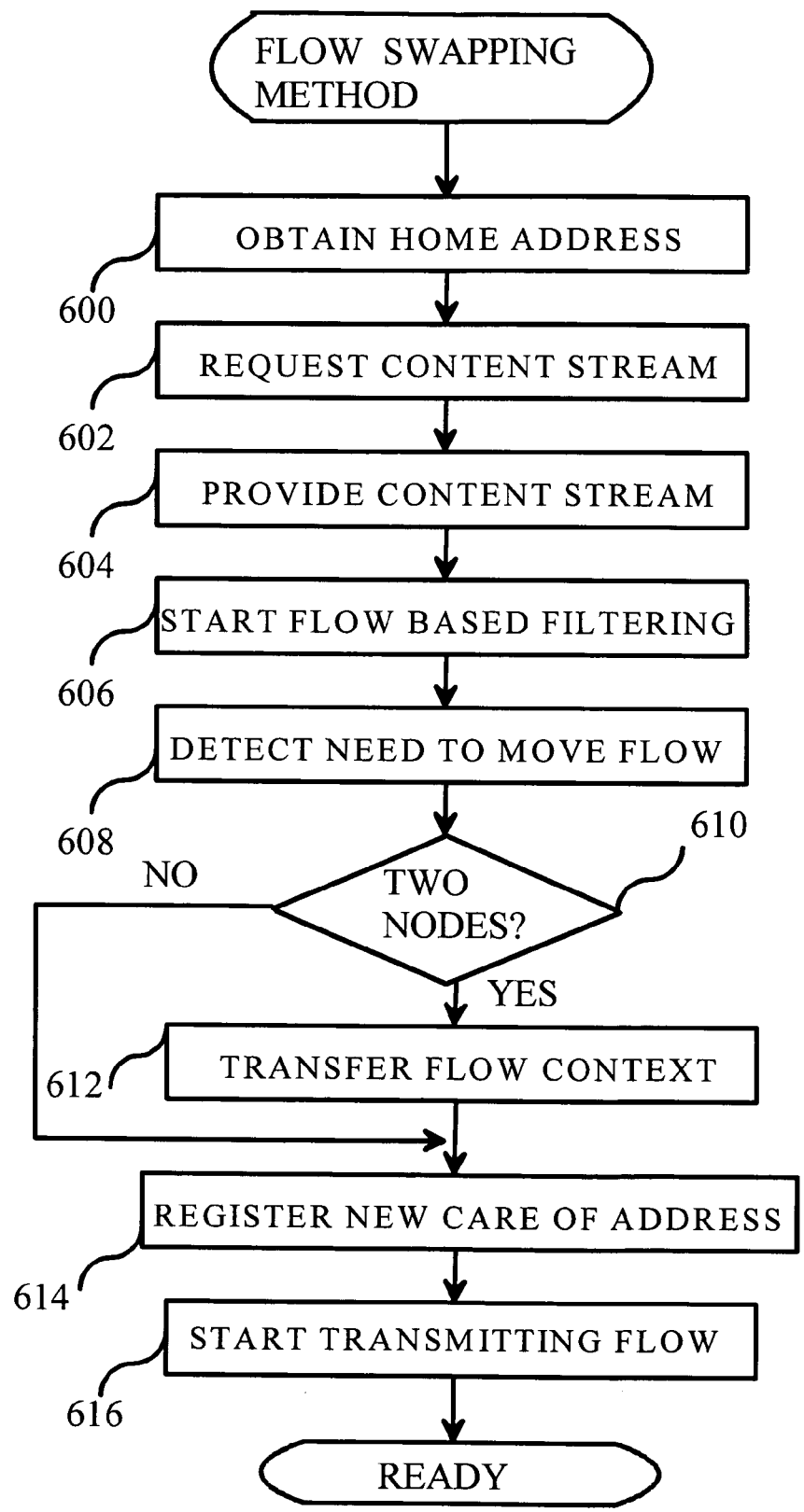
FIG. 6 is a flow chart depicting one embodiment of swapping a flow between two nodes in a system of FIG. 4 or FIG. 5, in accordance with the invention.
Figure 9:
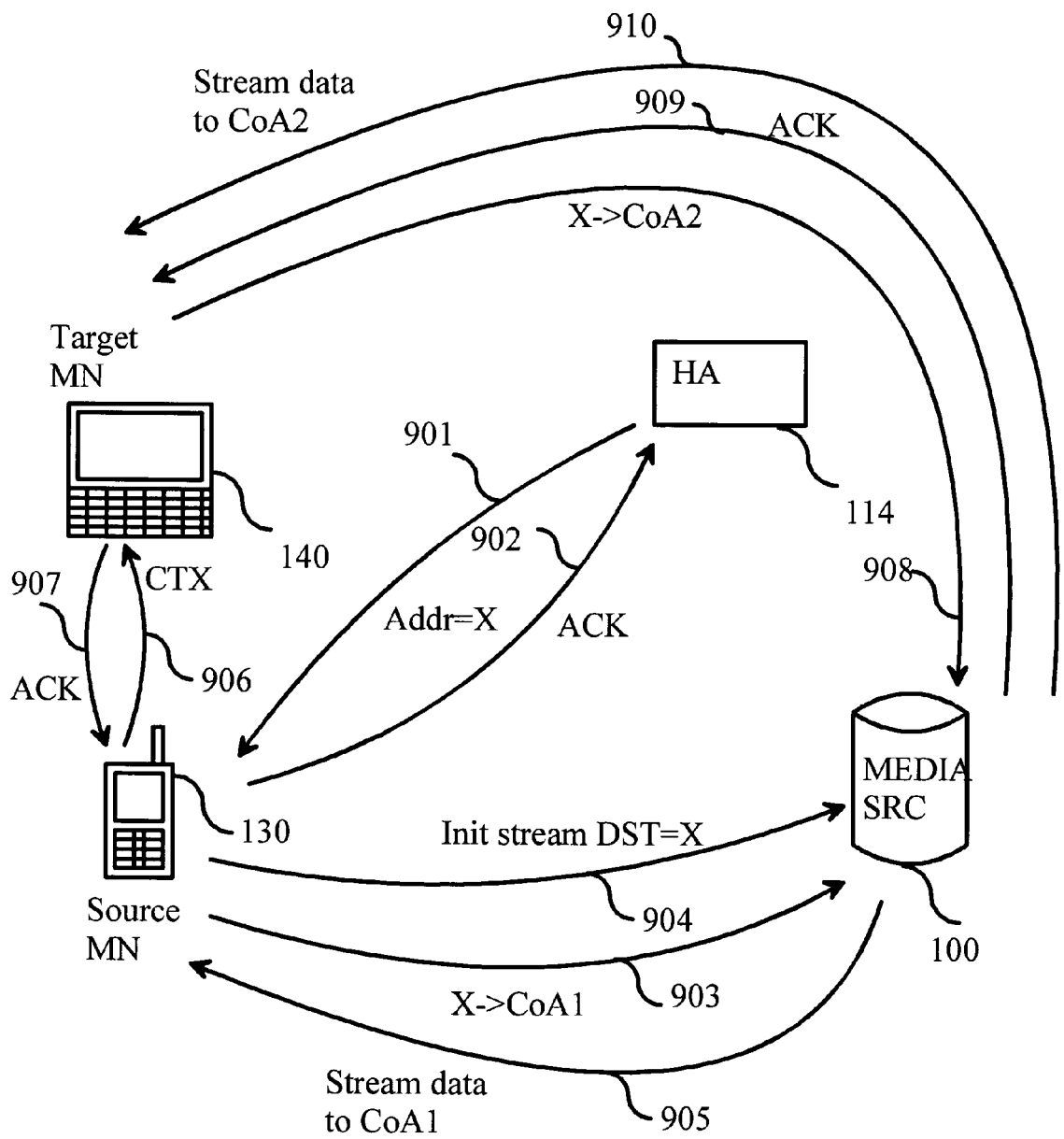
FIG. 9 is a block diagram illustrating a signaling procedure for the swapping of a flow between two network nodes and the use binding updates to a content source node in a communication system, in accordance with the invention.

FIG. 6 is a flow chart depicting one embodiment of swapping a flow between two nodes in a system of FIG. 4, FIG. 5 or FIG. 9 in one embodiment of the invention. In FIG. 4 there are two network nodes, a node 130 and a node 140. The nodes have separate network addresses, which are, for example, care-of-addresses. The network addresses of nodes 130 and 140 are CoA1 and CoA2, respectively. In FIG. 4 there is a home agent 114, which performs flow swapping between target nodes. Home agent 114 does not necessarily have to be a full-blown home agent in the Mobile IP sense, namely it does not have to support all IPv6 or the Mobile IP features. Only features pertinent for the purposes of this invention are necessary. It should further be noted that the care-of-addresses and home addresses in this context are used for the purposes of the swapping of flows. Nothing prevents the simultaneous use of another layer of network layer mobility. The care-of-addresses in this context may also be home addresses for another home agent, which takes care of mobility of nodes in accordance with network layer mobility, for example, the Mobile IP or the IPv6. Similarly, in one embodiment of the invention a care-of-address may also be a permanent address associated with a node such as a fixed IP network node address. In FIG. 4 there is also a media source 100, which provides streaming content for nodes 130 and 140. Media source 100 is thus the content source node. The content may be video, audio, vector animation or a shared whiteboard associated with a multimedia conference. The content may also be a timed sequence of still pictures. The content is provided from media source 100 in the form of a media stream, which is carried in a flow of packets. In one embodiment of the invention, a flow is identified using a flow label carried in packet headers. It should be noted that the number of nodes and network elements may vary in different actual implementations and their number in FIGS. 4 and 5 is just chosen for illustrative purposes.

In step 600 a node 130 obtains a home address. In one embodiment of the invention, the home address is temporary and remains reserved for the use of node 130 only during the course of one multimedia session or generally for the duration of a given multimedia stream. Such a home address can be called a Temporary Address for a Flow (THAF). The acquisition of a THAF or generally a home address is illustrated in FIG. 4 using arrows 400 and 401. Node 130 informs HA 114 of its current care-of-address, which in this case is referred to as CoA1. Thereupon, node 130 receives from HA 114 a home address, which is referred to in FIG. 4 as address X. HA 114 forms a mapping from the home address acquired to CoA1. In one embodiment of the invention, there is a home address for each flow. By receiving only a single flow per home address it is possible to control the swapping of flows between terminals and ensure that the content associated with the flow media stream has been paid for. In this embodiment node 130 receives more than one home address from HA 114. In one embodiment of the invention, HA 114 is only used to obtain a home address. Thereafter, the changes in the binding of the home address to a current network address are informed directly to content source nodes such as media source 100. Of course, in this embodiment the binding updates may optionally be sent to HA 114 also. In this way also possible future content sources, the addresses of which are not know beforehand to node 130 or node 140 can have their flows transmitted to correct current network address so that they are received and forwarded by HA 114.

In step 602 node 130 initiates a multimedia session with media source 100. The arrow 403 represents the establishment of the multimedia session and the flow. In one embodiment of the invention the establishment of the multimedia session is performed via HA 114. The multimedia session comprises at least one media stream that is carried in a packet flow. In one embodiment of the invention, each flow has a unique flow label. The multimedia session may be established using, for example, real-time streaming protocol signaling. The multimedia session establishment comprises the requesting of a given multimedia presentation from media source 100 to be delivered to the home address of node 130. The multimedia presentation is identified, for example, using a URL. The presentation comprises, for example, video and audio. Furthermore, node 130 and media source 100 agree on media stream parameters. Node 130 may separately request the starting of streaming when the URL for the multimedia presentation has been identified and the media stream parameters have been agreed upon between node 130 and media source 100.

In step 604 media source 100 starts sending packet flows corresponding to the media streams associated with the session that has been established. Each flow may be forwarded to a different home address for node 130. For the purposes of illustration it is assumed, that there is a first flow corresponding to a video stream and a second flow corresponding to audio stream. The first flow is sent to a first home address and the second flow is sent to a second home address. Both home addresses are just for node 130. The packets belonging to the first and the second flows are sent from media source 100 to HA 114. HA 114 forwards the packets sent to node 130 home addresses to node 130 current address, which is CoA1 in FIG. 4. The route of packets destined to node 130 home addresses is illustrated using arrows 404 and 405.

In step 606 HA 114 starts filtering packets destined to the home addresses of node 130. In one embodiment of the invention, HA 114 accepts only one flow label per an acquired home address. When one flow label has been encountered in a packet destined to a given home address, other flow labels are subsequently not accepted. If a packet with a different flow label is received, HA 114 drops it. In one embodiment of the invention, HA 114 scrutinizes the packets first time received with a new flow label for upper protocol layer information and based on this checking makes the decision whether or not to accept the flow to the home address. The packets, which pass the filtering in HA 114, are forwarded by it to current care-of-address of node 130. In yet another embodiment of the invention, HA 114 receives information from node 130 pertaining to the flows to be accepted to the home address. This information may comprise the types of media streams expected by node 130, RTP ports and other similar information. The informing may be performed using a separate message exchange between node 130 and HA 114 or may have been performed during the course of home address reservation in step 600.

In step 608 a need to swap, in other words, move a flow from node 130 to node 140 is detected. The need may be purely based on user request. In one embodiment of the invention node 130 or node 140 detects automatically the proximity of node 130 to node 140. The proximity of the nodes may trigger the moving of a flow from node 130 to node 140. For example, a user may have specified that at the proximity of node 130 flow carrying video stream should be moved to node 140. The reason for this is that in FIG. 4 node 130 is a mobile terminal with a smaller display and limited graphics resolution. Therefore, it is useful to start viewing the video stream from node 140, which has a larger display. It may also be conceived that node 140 could have a very large display and it could be mounted on a wall. Always when the user is in the proximity of the wall, video can be viewed from the wall display. It is as well possible that an audio stream is moved to another node, which has better and larger loudspeakers. The proximity detection may be implemented using point-to-point wireless connection such as BLUETOOTH or infrared. The proximity detection may also be based on GPS receivers attached to node 130 and optionally node 140.

In step 610 it is checked whether the flow needs to be moved between two nodes or whether it is question of transfer between two interfaces associated with one node. It is assumed that node 130 makes the decision to swap the first flow mentioned earlier, which carries a video stream, to node 140.

In step 612 node 130 sends stream context comprising application specific information, media source 100 address, protocol stack state, the home address associated with the flow to be moved, flow label and authentication and authorization info to node 140. The stream context sent from node 130 to node 140 may also comprise video, audio, 3D scope/settings, various special effects (for example, vibration and lights), controlling info, synchronization info, text, pictures, even smell, mood, and temperature, cookies, browsing history, links, bookmarks and so on. The information sent depends on the presentation capabilities of nodes 130 and 140, as more capabilities are added, the state information pertaining to these capabilities must also be sent in the context information. In one embodiment of the invention the stream context is a generic media context that describes the characteristics of the media stream associated with the flow to be moved. In one embodiment of the invention, the sending of context is performed via a point-to-point wireless connection between nodes 130 and 140. In other embodiments the context is transferred via a cellular radio system or a wireless local area network. In FIG. 4 arrow 406 represents the transfer of context CTX from node 130 to node 140. The transfer is acknowledged by node 140, which is represented using arrow 407. In one embodiment of the invention, which is further illustrated in FIG. 5 no context is transferred since the flow is swapped between two interfaces associated with same node.

In one embodiment of the invention, the context transferred further comprises a second session key. The second session key has been derived by node 130 using a secret key that it shares with HA 114. HA 114 derives similarly the same second session key using the secret key. In association with the second session key may be transferred a validity time for the session key, flow label, the address of media source 100 and port numbers. The idea of the second session key is to avoid attacks where an arbitrary node acts as an imposter for node 140 towards HA 114 and captures a flow without authorization of node 130. Further, nodes 130 and 140 may perform mutual authentication before a context transfer takes place. This occurs, for instance, using public key infrastructure (PKI) provided by a network to which both nodes are connected. The authentication may also be based on a key shared by nodes 130 and 140, which has been obtained to both nodes beforehand.

In step 614 node 140 makes a binding update to HA 114, which informs that flow packets for the first flow carrying video stream are to be forwarded from now on to node 140. In one embodiment of the invention node 130 makes the binding update to HA 114 on behalf of node 140. Node 140 indicates that home address associated with first flow is to be mapped to node 140 current care-of-address, which is CoA2 in FIG. 4. HA 114 forms an association between the home address of the first flow and the node 140 current address. This in effect causes that the first flow gets swapped from node 130 to node 140, if only one flow is allowed per home address. In one embodiment of the invention HA 114 continues transmitting the first flow also to node 130, for example, for a specified time or for the entire duration of the remaining flow. In one embodiment of the invention node 140 informs to HA 114 also the flow label associated with the flow to be swapped between node 130 and node 140. In this case HA 114 forms a mapping from home address and flow label to the node 140 current address, which is CoA2 in FIG. 4. HA 114 acknowledges the binding update. The arrows 408 and 409 represent the binding update and the acknowledgement, respectively.

In step 616 HA 114 starts forwarding packets associated with the flow moved to node 140. The forwarding of packets is illustrated in FIG. 4 using arrow 410. In one embodiment of the invention HA 114 maps the home address and flow label pair to the current address of node 140. In this embodiment HA 114 maintains information about home address and flow label associations, which are formed at the request of flow destination nodes like node 130 or node 140. In one embodiment of the invention node 140 indicates also to media source 100 that home address associated with the first flow is to be mapped to node 140 current care-of-address, which is CoA2 in FIG. 4. In a manner similar to HA 114, media source 100 forms an association between the home address of the first flow and the current address of node 140. In one embodiment of the invention media source 100 maps the home address and flow label pair to the current address of node 140. In this embodiment media source 100 maintains information about home address and flow label associations, which are formed at the request of flow destination nodes like node 130 or node 140.

FIG. 5 illustrates a signaling procedure for swapping a flow between two network nodes associated with a single physical node in a communication system in one embodiment of the invention. The network nodes appear as two nodes for a home agent, that is, HA 114. In FIG. 5 nodes 521 and 522 are operating in access networks 531 and 532, respectively. Network nodes 531 and 532 are in fact just network interfaces units such as, for example, interface cards connected to a single physical node 140. Access networks 531 and 532 may be, for example, GPRS networks, wireless local area networks cdma2000 or UMTS networks. However, it is useful that the networks are of different types. In this way it is possible to move flows to a different access network whenever an access network providing a better data transfer rate, or cheaper prize for user becomes reachable from a mobile node. In FIG. 5 arrow 501 represents the requesting of home address for node 521 and the informing of its address, namely CoA1. Arrow 502 represents the response from HA 114, which provides the home address, namely X. Arrow 503 represents the establishment of a session and the flow, which is assigned to the home address X. Arrows 504 and 505 represent the forwarding of flow packets from a media source 100 to node 521 via HA 114, which maps the home address X to CoA1. Arrow 506 represents the binding update request sent from node 522, which is initiated when node 140 has made the decision to move flow from node 521 to 522. The binding update carries the address of node 522, namely CoA2. Arrow 507 is the acknowledgement sent by HA 114 in response to the binding update. Arrow 508 represents the forwarding of packets from media source 100 via HA 114 to node 522.

Figure 7:
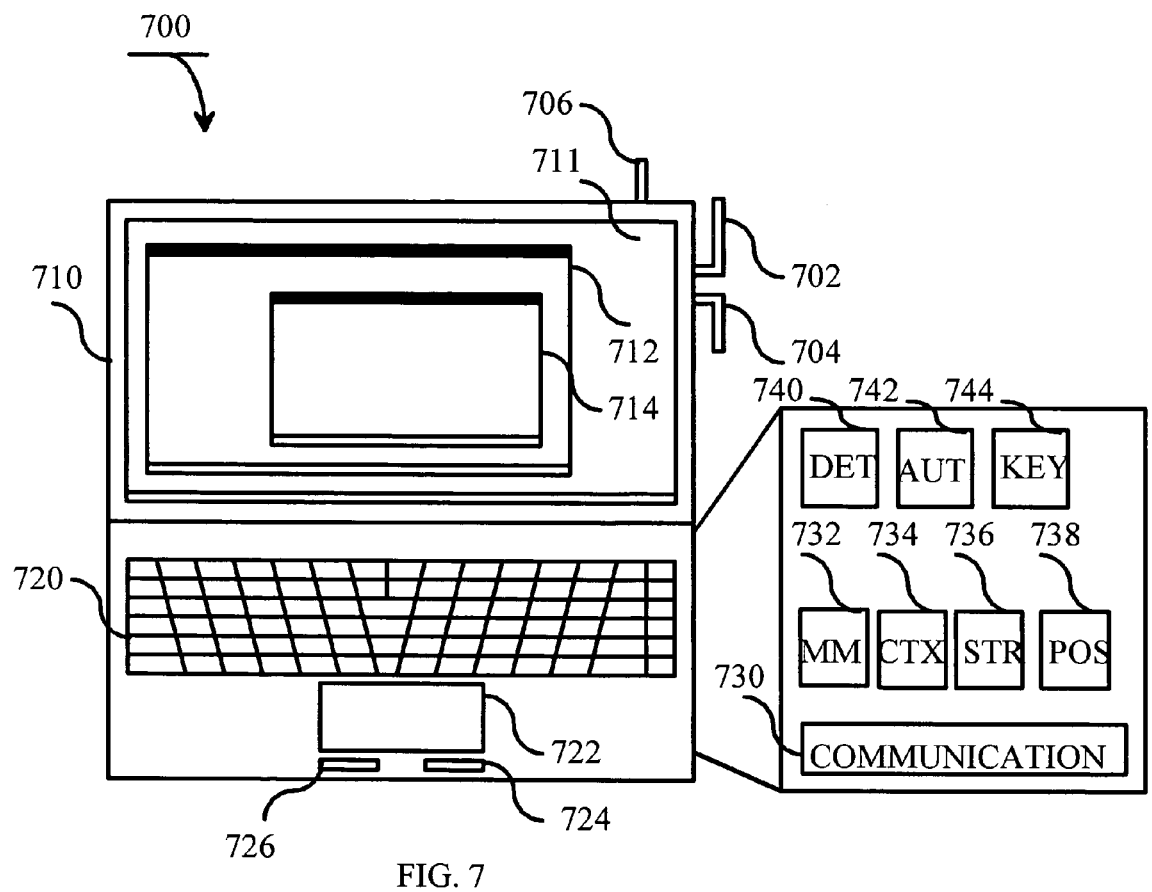
FIG. 7 illustrates an electronic device, in accordance with the invention.

FIG. 7 illustrates one embodiment of the invention wherein an electronic device 700 such as a mobile terminal implements the flow swapping method. The electronic device is organized to execute a computer program, which implements the functions associated with the invention disclosed herein. Electronic device 700 has display 710, a keyboard 720, a pointer device 722 with buttons 724 and 726. Display 710 presents a graphical user interface 711. Graphical user interface 711 has a window 714 on which video stream may be presented. Other information pertaining to the multimedia presentation is shown in window 712. Electronic device also has network interfaces 702 and 704. In one embodiment of the invention network interface 702 and 704 are treated from the point of view of the invention as independent network nodes that are connected to electronic device 700. There is also a radio link 706, which is used for proximity detection and/or point-to-point radio communication between two nodes. Electronic device executes software, that is, a computer program, which comprises a communication protocol 730, address management means 732, context transfer means 734, streaming means 736, positioning means 738, detection means 740, authentication means 742 and key derivation means 744. The means 730-744 exchange data with the communication protocol 730. The detection means 740 optionally together with user interface 711 act as authorization means, which authorize the moving of flow between two nodes. The authorization means may ask permission from a user for the moving of a flow. The detection means exchange data with a radio communication link 706, if the detection of the need for moving a flow from a first node to a second node is based on the proximity of two nodes, which is determined using point-to-point radio connection. Communication protocol 730 comprises, for example, the IP protocol stack. In one embodiment of the invention the steps of obtaining the home address and the registering of a new care-of-addresses are performed by address management means 732. In one embodiment of the invention address management means 732 register also information about flow labels for the purpose of flow swapping. The transfer of flow context is performed by context transfer means 734. The need to move a flow between nodes is detected by detecting means 740. Streaming means 736 perform the streaming related steps such as the initiation and the management of streaming. It should be noted that in other embodiments of the invention the mobile device has other types of displays, keyboards or input devices and pointer devices. In one embodiment of the invention the electronic device is connected to a mobile network, for example, a Universal Mobile Telecommunications Service (UMTS), a Global System of Mobile communications (GSM) network or a Wireless Local Area Network (WLAN).

Figure 8:
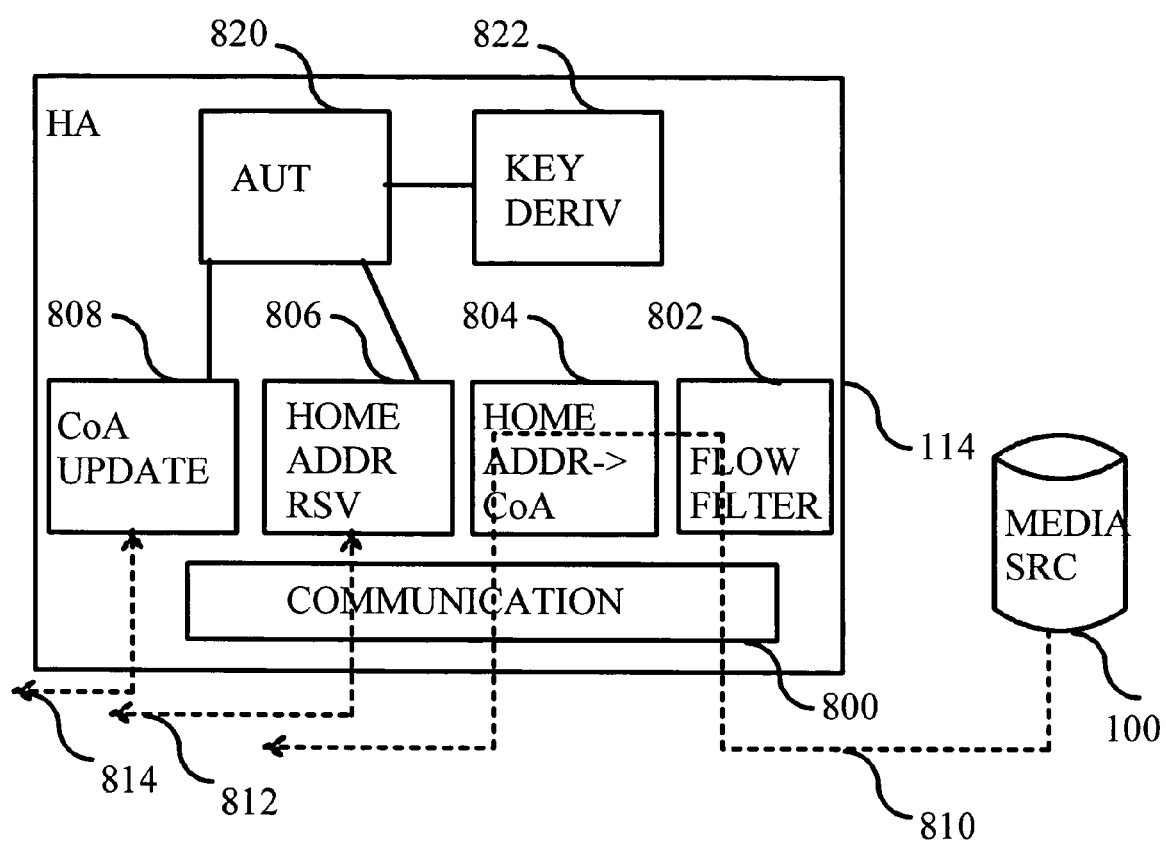
FIG. 8 illustrates a network node, in accordance with the invention.

FIG. 8 illustrates a network node 114 in accordance with one embodiment of the invention. Network node 114 performs the tasks associated with a home agent, that is, HA 114 as illustrated in FIGS. 4 and 5. HA 114, in other words, network node 114 comprises home address reservation means 806, which perform the reservation of home addresses for flows at the request of other nodes. HA 114 further comprises updating means 808, which perform the updating of the address to which the home address is to be mapped currently. In one embodiment of the invention the updating means update the mapping from home address and flow label to the target node current address. For the forwarding of packets HA 114 comprises communication protocol means 800, flow filter 802 and address mapping means 804. For the authentication of messages HA 114 comprises authentication means 820. For the derivation of session keys HA 114 comprises key derivation means 822. A media stream 810 is associated with a given home address. Media stream 810 is carried in a flow of packets from media source 100 to HA 114. The flow has a unique flow label. A packet received to HA 114 from media source 100 is sent by the communication protocol means 800 to flow filter 802. Flow filter drops packets that have a flow label, which is not explicitly authorized for the home address specified in packet header. Address mapping means 804 map the home address specified and optionally the also the flow label in the packet header into the current address associated with the home address. Address mapping means 804 replace the home address with the current address before the packet is sent to communication protocol means 800 for forwarding towards a receiving node such as nodes 130 and 140 in FIG. 4. A binding update request and the acknowledgement to it is represented by arrow 814. A home address reservation request and the acknowledgement to it is represented by arrow 812.

FIG. 9 illustrates a signaling procedure for the swapping of a flow between two network nodes in a communication system in one embodiment of the invention where the binding updates are sent directly to a content source node. In FIG. 9 there are two network nodes, a node 130 and a node 140. The nodes have separate network addresses, which are, for example, care-of-addresses. The network addresses of nodes 130 and 140 are CoA1 and CoA2, respectively. In FIG. 9 there is a home agent 114, which performs at least the allocation of home addresses for nodes such as, for example, node 130 and node 140. In FIG. 9 media source 100 performs the swapping of flows between target nodes. Media source 100 does not have to be a full-blown home agent in the Mobile IP sense, namely it does not have to support all IPv6 or the Mobile IP features. Only features pertinent for the purposes of this invention are necessary. It should further be noted that the care-of-addresses and home addresses in this context are used for the purposes of the swapping of flows. Nothing prevents the simultaneous use of another layer of network layer mobility. The care-of-addresses in this context may also be home addresses for another home agent, which takes care of mobility of nodes in accordance with network layer mobility, for example, the Mobile IP or the IPv6. Similarly, in one embodiment of the invention a care-of-address may also be a permanent address associated with a node such as a fixed IP network node address. In FIG. 9 there is media source 100, which provides streaming content for nodes 130 and 140. Media source 100 is thus the content source node. In one embodiment of the invention, a flow is identified using a flow label carried in packet headers.

In FIG. 9 node 130 obtains a home address from HA 114. This home address is X in FIG. 9. Node 130 acknowledges the receiving of the home address. This message exchange is represented in FIG. 9 using arrows 901 and 902. Before establishing a session with media source 100 or before starting to receive a media stream carried in a flow from media source 100, node 130 informs its current address, namely CoA1 in FIG. 9, to media source 100. The providing of the current address of node 130 to media source 100, is represented in FIG. 9 using arrow 903. This is acknowledged by media source 100. In one embodiment of the invention node 130 also informs its current address also to HA 114 before or after informing it to media source 100. This occurs, for example, in case content may be received from a node to which current address has not been informed. The providing of a first flow is started from media source 100 to node 130 when node 130 has requested that. The initiation of the receiving of a first flow to home address, namely address X, is represented using arrow 904. Thereupon, the first flow is transmitted from media source 100 to the current address of node 130. Until the message informing the current address of node 130, that is, the binding update request, is received to media source 100, the first flow is transmitted by media source 100 towards HA 114. This is due to the fact that there is no binding yet between the home address and the current address of node 130. In one embodiment of the invention binding updates are sent only to a home agent such as HA 114.

The sending of binding updates directly to media source 100 optimizes the routing of packets to node 130, since the packets addressed to node 130 home address are already sent to node 130 current address from media source 100. If binding updates are sent to media source 100 it must perform the mapping of home addresses to the current addresses of the nodes that have performed the binding update. If only one flow is allowed per home address, media source 100 also checks that packets carrying only one flow are allowed to a given home address. The filtering of flow packets to a given home address is performed, for example, so that a first packet carrying a flow label received to the home address determines the allowed flow label for the rest of the packets addressed to the home address.

The transferring of context between node 130 to node 140 is performed when either of the nodes detects a need to move at least the first flow to node 140. The transferring of context is represented in FIG. 9 by arrows 906 and 907. The context is transferred as explained in associated with FIG. 6.

When the flow is to be moved, node 140 informs its current address, that is CoA2 in FIG. 9, to media source 100. This binding update is needed to media source 100 especially in cases where node 130 has performed a binding update to media source 100. I this way the moving of the flow occurs when the node actually transmitting the flow, that is, media source 100 receives the binding update. The binding update request informing node 140 current address and the home address associated with it and the acknowledgement is represented in FIG. 9 using arrows 908 and 909. After having received the binding update, which in FIG. 9 carries address CoA2 to media source 100, pertaining to the home address for the first flow, media source 100 starts transmitting the first flow to node 140. Thereupon the home address X, which originally node 130 obtained from HA 114, gets mapped to the address of node 140, namely CoA2. In one embodiment of the invention a binding update to media source 100 carries also the flow label in addition to the home address and the current address of the target node. This occurs in the cases where the binding is from the home address and flow label pair to the current address of the target node.

Figure 10:
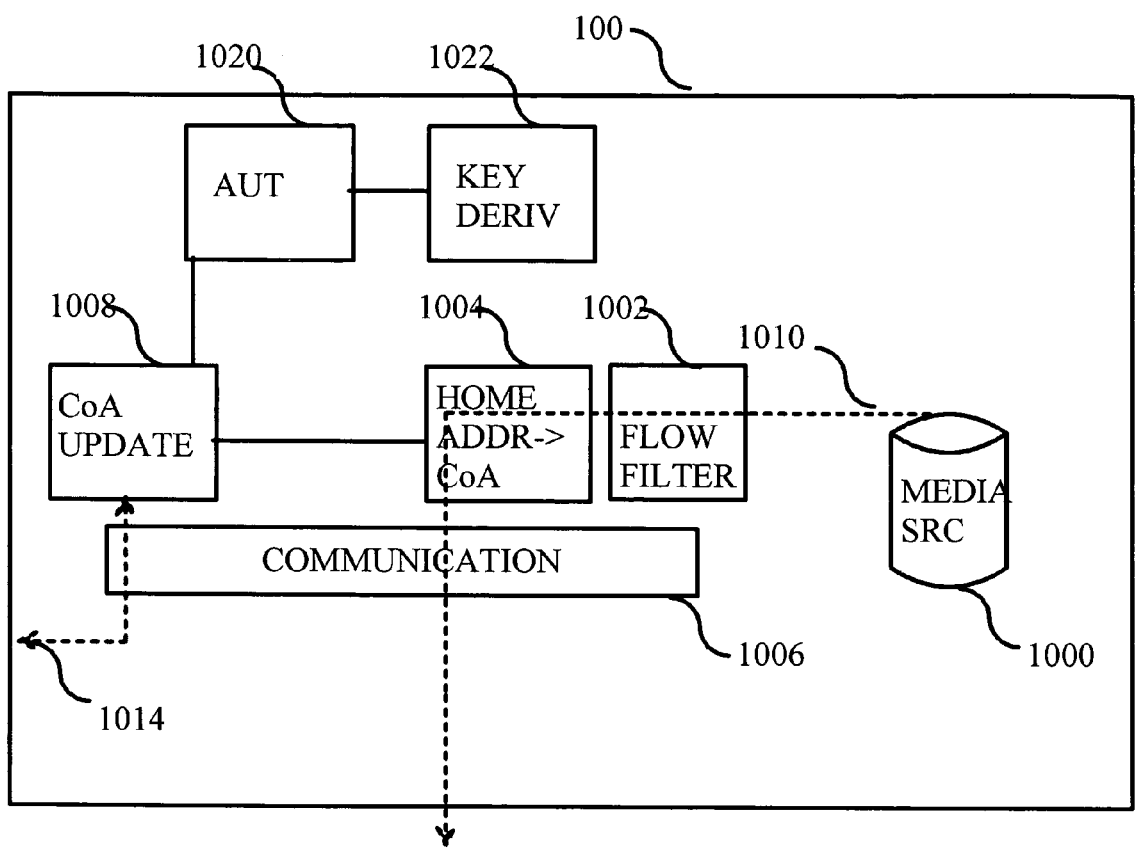
FIG. 10 illustrates a media source node, in accordance with the invention.

FIG. 10 illustrates a media source node, such as media source 100 in FIGS. 4, 5 and 9, in accordance with one embodiment of the invention. Media source node 100 comprises a media source application 1000, which provides at least a first media stream carried in a first flow of packets 1010. Media source node 100 comprises updating means 1008, which perform the updating of the address to which the home address is to be mapped currently. In one embodiment of the invention the updating means update the mapping from home address and flow label to the target node current address. For the transmitting of packets media source node 100 comprises communication protocol means 1006, flow filter 1002 and address mapping means 1004. For the authentication of messages media source node 100 comprises authentication means 1020. For the derivation of session keys media source node 100 comprises key derivation means 1022. A media stream 1010 is associated with a given home address. Media stream 1010 is carried in a flow of packets generated by media source application 1000. The flow has a unique flow label. A packet generated is sent to flow filter 1002. Flow filter drops packets that have a flow label, which is not explicitly authorized for the home address specified in packet header. In one embodiment of the invention flow filter allows only packets with one flow label to be addressed to a given home address. Address mapping means 1004 map the home address specified and optionally the also the flow label in the packet header into the current address associated with the home address. Address mapping means 1004 replace the home address with the current address before the packet is sent to communication protocol means 1006 for transmission towards a receiving node such as nodes 130 and 140 in FIG. 9. A binding update request and the acknowledgement to it is represented by arrow 1014.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A method, comprising:
informing a current address of a first node to at least one of a third node and a content source node;
receiving at least one home address for said first node in response to the informing of the current address;
initiating a multimedia session between said first node and said content source node, wherein said multimedia session comprises at least two flows associated with different home addresses, and wherein each of said at least two flows carries a separate media stream;
receiving said at least two flows from said content source node at said first node; and
detecting a need to move at least one flow among said at least two flows from said first node to a second node.

2. The method according to claim 1, wherein said first node and second node are interfaces associated with a single physical electronic device.

3. The method according to claim 1, wherein said first node and second node are separate electronic devices.

4. The method according to claim 2, wherein said first node is served by a first access network and said second node is served by a second access network.

5. The method according to claim 4, wherein at least one of said first access network and said second access network is one of a wireless local area network, a general packet radio service network and a universal mobile telecommunications network.

6. The method according to claim 1, the method further comprising:
transferring a context associated with at least said at least one first flow from said first node to said second node.

7. The method according to claim 6, wherein said transferring of the context is performed using a point-to-point radio link.

8. The method according to claim 6, wherein said transferring of the context is performed using a multi-node network.

9. The method according to claim 6, wherein a part of said context is transferred via a point-to-point link and another part of said context is transferred via a multi-node network.

10. The method according to claim 1, further comprising:
filtering packets addressed to said at least one home address in at least one of said third node and said content source node based on flow labels indicated in packets.

11. The method according to claim 1, wherein said at least one of said third node and said content source node continues transmitting said at least one first flow to said first node while transmitting said at least one first flow to said second node.

12. The method according to claim 1, wherein said need to move said at least one first flow is detected based on a proximity of said first node and said second node.

13. The method according to claim 12, wherein said proximity of said first node and second node is detected using a point-to-point radio link.

14. The method according to claim 1, wherein said need to move said at least one first flow is detected by said first node.

15. The method according to claim 1, wherein said need to move said at least one first flow is detected by said second node.

16. The method according to claim 14, wherein said first node requests permission from said second node to move said at least one first flow to said second node.

17. The method according to claim 15, wherein said second node requests permission from said first node to get said at least one first flow from said first node.

18. The method according to claim 1, further comprising: informing, by said second node, an address of said second node and said at least one home address to said third node.

19. The method according to claim 1, further comprising: informing, by said second node, an address of said second node and said at least one home address to said third node.

20. The method according to claim 1, further comprising: deriving a second key from a first key shared by said first node and said third node; and
authenticating the informing of addresses from said second node to said third node using said second key.

21. The method according to claim 4, wherein one or more of the first and second access networks is an internet protocol network.

22. An apparatus, comprising:
a processor configured to
inform a current address of said apparatus to at least one of a third node and a content source node,
retrieve at least one home address for said apparatus in response to the informing of the current address,
initiate a multimedia session between said apparatus and said content source node, wherein said multimedia session comprises at least two flows associated with different home addresses, and wherein each of said at least two flows carries a separate media stream to receive said at least two flows from said content source node at said apparatus, and
detect a need to move at least one first flow among said at least two flows from said apparatus to a second node.

23. The apparatus according to claim 22, wherein the processor is further configured to transfer a context associated with the at least one first flow from said apparatus to another electronic device.

24. The apparatus according to claim 23, wherein the processor is configured to perform the transfer via a point-to-point radio link.

25. The apparatus according to claim 22, wherein said processor is further configured to determine a proximity of said apparatus to at least one other electronic device.

26. The apparatus according to claim 25, wherein said processor is further configured to determine said proximity using a point-to-point radio link.

27. The apparatus according to claim 22, wherein said processor is further configured to authenticate messages sent from said apparatus to at least one of said third node and said content source node.

28. An apparatus, comprising:
a processor configured to
receive a current address of a first node to send at least two home addresses for said first node in response to the receiving of the current address,
register a mapping from said at least two home addresses to the current address of the first node,
receive at least two flows associated with a multimedia session from a content source node, wherein each of said at least two flows is addressed to a different home address among said at least two home addresses,
map said at least two home addresses to the current address of the first node,
receive a new current address for a first home address among said at least two home addresses, wherein said new current address is associated with a flow to be moved, and
register a mapping from said first home address to said new current address.

29. The apparatus according to claim 28, wherein the processor is further configured to filter packets addressed to node home addresses based on flow labels indicated in the packets.

30. The apparatus according to claim 28, wherein said processor is further configured to authenticate messages received by said network node from said first node.

31. The apparatus according to claim 28, wherein said apparatus comprises an internet protocol network node.

32. A computer program embodied on a computer-readable medium, the computer program controlling a processor to perform a process, when the computer program executed by a computer, the process comprising:
informing current address of a first node to at least one of a third node and a content source node;
receiving at least one home address for said first node in response to the informing of the current address;
initiating a multimedia session between said first node and said content source node, wherein said multimedia session comprises at least two flows associated with different home addresses, wherein each of said at least two flows carries a separate media stream;
receiving said at least two flows from said content source node at said first node; and
detecting a need to move at least one first flow among said at least two flows from said first node to a second node.

33. The computer program according to claim 32, wherein said first node and second node are interfaces associated with a single physical electronic device.

34. The computer program according to claim 32, wherein said first node and second node are separate electronic devices.

35. The computer program according to claim 33, wherein said first node is served by a first access network and said second node is served by a second access network.

36. The computer program according to claim 32, the process further comprising:
transferring a context associated with the at least one first flow from said first node to said second node.

37. The computer program according to claim 36, wherein said transferring of the context is performed using a point-to-point radio link.

38. The computer program according to claim 32, wherein said need to move the at least one first flow is detected based on a proximity of said first node and said second node.

39. The computer program according to claim 38, wherein said proximity of said first and second node is detected using a point-to-point radio link.

40. The computer program according to claim 32, the process further comprising:
deriving a second key from a first key shared by said first node and at least one of said third node and said content source node; and
authenticating the informing of addresses from said second node to at least one of said third node and said content source node using said second key.

41. The computer program according to claim 32, wherein one or more of the first and second access networks is an internet protocol network.

42. An apparatus, comprising:

a transmitter configured to inform a current address of said apparatus to at least one of a third node and a content source node;

a processor configured to receive at least one home address for said apparatus in response to the informing of the current address, and initiate a multimedia session between said apparatus and said content source node, wherein said multimedia session comprises at least two flows associated with different home addresses, and wherein each of said at least two flows carries a separate media stream; and a receiver configured to receive said at least two flows from said content source node at said apparatus, wherein the processor is further configured to detect a need to move at least said first flow from said apparatus to a second node.

43. The apparatus according to claim 42, wherein said apparatus and said second node are interfaces associated with a single physical electronic device.

44. The apparatus according to claim 42, wherein said apparatus and said second node are separate electronic devices.

45. The apparatus according to claim 43, wherein said apparatus is served by a first access network and said second node is served by a second access network.

46. The apparatus according to claim 42, wherein the transmitter is further configured to transfer a context associated with said at least one first flow from said apparatus to said second node.

47. The apparatus according to claim 46, wherein the transmitter is configured to transfer the context using a point-to-point radio link.

48. The apparatus according to claim 42, wherein the processor is further configured to detect said need to move said at least one first flow based on a proximity of said apparatus and said second node.

49. The apparatus according to claim 48, wherein the processor is configured to detect said proximity of said apparatus and said second node using a point-to-point radio link.

* * * * *